United States Patent [19]
Gutweiler et al.

[11] Patent Number: 5,384,346
[45] Date of Patent: Jan. 24, 1995

[54] POLYVINYL BUTYRALS HAVING IMPROVED THERMAL STABILITY AND LIGHT RESISTANCE

[75] Inventors: Matthas Gutweiler, Taunusstein; Ulrich Hutten, Kelkheim; Gerhard Pfahler, Augsburg; Hermann Schindler, Wallau, all of Germany

[73] Assignee: Hoechst AG, Germany

[21] Appl. No.: 58,896

[22] Filed: May 6, 1993

[30] Foreign Application Priority Data

May 8, 1992 [DE] Germany .................. 4215141

[51] Int. Cl.⁶ .................. C08K 5/58; C08K 5/37; C08K 5/3435
[52] U.S. Cl. .................. 524/100; 428/437; 514/180; 514/303; 514/304; 514/291; 514/193; 514/194; 514/392
[58] Field of Search .............. 524/100, 291, 303, 304, 524/193, 194, 180, 392; 428/437

[56] References Cited

U.S. PATENT DOCUMENTS

| | | | |
|---|---|---|---|
| 3,402,139 | 9/1968 | Mont et al. | 428/437 |
| 3,422,059 | 1/1969 | Taylor et al. | 524/291 |
| 3,455,875 | 7/1969 | Mauz et al. | 524/291 |
| 3,577,384 | 5/1971 | Mauz et al. | 524/291 |
| 3,646,110 | 2/1972 | Eggensperger et al. | 524/291 |
| 3,823,113 | 7/1974 | Reisman | 524/91 |
| 3,950,305 | 4/1976 | Schmidt . | |
| 4,704,418 | 11/1987 | Gomez | 428/437 |
| 5,190,826 | 5/1991 | Asahina et al. | 428/437 |

FOREIGN PATENT DOCUMENTS

| | | |
|---|---|---|
| 17363 | 7/1983 | Australia . |
| 26956 | 12/1988 | Australia . |
| 1028089 | 3/1978 | Canada . |
| 1266740 | 3/1990 | Canada . |
| 3228076 | 2/1984 | Germany . |

*Primary Examiner*—Veronica P. Hoke
*Attorney, Agent, or Firm*—Bierman and Muserlian

[57] ABSTRACT

Polyvinyl butyrals (PVBs) with improved thermal stability and improved light resistance contain as stabilizers polynuclear phenols which phenolic radicals have a quaternary carbon atom in the para-position to the phenolic hydroxyl group and if desired in combination with synergistically acting, nitrogen-containing, sulfur-containing or phosphorus-containing co-stabilizers of the types a) to d). The use of the resulting films of low yellowness as interlayer films having substantially reduced yellowing for the production of laminated glasses and glass composites of silicate glass sheets is described.

14 Claims, No Drawings

POLYVINYL BUTYRALS HAVING IMPROVED THERMAL STABILITY AND LIGHT RESISTANCE

The present invention relates to stabilizer-containing polyvinyl butyrals (PVBs) with contents of stabilizers of polynuclear phenols whose phenolic radicals have a quaternary carbon atom in the para-position to the phenolic hydroxyl group, and also with or without contents of nitrogen-containing, sulfur-containing or phosphorus-containing co-stabilizers or mixtures of these co-stabilizers that have a synergistic effect in combination with the polynuclear phenols, and with or without contents of further stabilizers, preferably light stabilizers, and with or without contents of further conventional additives and also with or without contents of plasticizers. The invention also relates to a process for preparing the stabilizer-containing polyvinyl butyrals and their use, preferably after thermoplastic shaping, in particular in plasticized form as interlayer films having improved thermal stability, reduced yellowing and reduced edge discoloration in the production of glass composites, and also if desired having improved light stability.

Plasticizer-containing polyvinyl butyrals have as is known been processed as thermoplastics for a long time in large amounts and extruded in particular into films having, inter alia, outstanding mechanical properties, and are also used as interlayers in multilayer laminated glasses, preferably for vehicle windows, architectural glasses for the construction sector, and bullet-proof glasses.

A disadvantage of polyvinyl butyrals (PVBs) is their high oxidation sensitivity, especially at high temperatures, compared to other industrially usable polymers, and also their instability and susceptibility to hydrolysis by acids. PVBs are therefore expediently stabilized before or during their processing, preferably as thermoplastics, by adding antioxidants, preferably phenols, and a small amount of an alkali metal hydroxide is also added to prevent acid hydrolysis.

Since films of plasticized PVBs frequently exhibit too strong an adhesion to inorganic glasses, adhesion-reducing substances, for example alkaline-reacting salts such as potassium acetate, can be added before or during the production of the films in order to reduce this adhesion capacity. The addition of such alkaline-reacting antiadhesion agents and also the high melt temperatures of in general ≧180° C. that are used during the extrusion nevertheless result as is known in considerably discolored plasticized PVB films. Numerous attempts and measures have therefore already been disclosed, aimed at reducing the discoloration of PVB films. For example, the additional stabilization of PVB by a benzotriazole derivative is known from U.S. Pat. No. 3,823,113. The use of a combination of a phenolic antioxidant and a phosphite for PVB stabilization is described in DE-C 3347040 and DE-A 3228076. However, it has been found that only slight or unsatisfactory stabilization results can be achieved by the methods described in the aforementioned publications, and in particular the long-term stabilization of PVBs using phosphite can be problematical. As is known, phosphites have a tendency to hydrolyze under the action of alkalies and thus to release phosphorous acid, which can then result in or contribute to the decomposition of the PVB.

As is known, the primary stabilizer used in PVB stabilization is generally a phenolic antioxidant, preferably a sterically hindered substituted phenol. DE-C 2208167 describes phenols of this type substituted in the orthoor para-position to the phenolic OH group and their use in PVB stabilization, mononuclear phenols such as isobornylxylenol or 2,6-di-t-butyl-4-methylphenol generally being used for this purpose.

If phenols of this type, for example isobornylxylenol, are used to stabilize plasticized PVB films, when the latter are employed in the production of laminated glass according to the conventional autoclave method, edge discolorations also occur in the finished glass composites, which is very unsatisfactory and often results in losses.

In addition to mononuclear phenols, polynuclear phenols are also of interest for PVB stabilization since they have certain property advantages compared to mononuclear phenols. For example, on account of their molecular size they are less highly volatile and exhibit a lesser tendency to migrate to the interfaces, which inter alia reduces the possibility of influencing the adhesion of the films at the glass surfaces of glass composites. However, as is known, previous attempts to use polynuclear phenols as PVB stabilizers have frequently led to unsatisfactory results.

It was thus the object of the present invention to provide stabilizer systems for polyvinyl butyral films that do not exhibit the aforedescribed disadvantages of known PVB stabilizers and, in addition to reducing the tendency to yellowing in the production of plasticized PVB films, in particular also enable glass composites to be produced without any, or with only very slight, edge discolorations.

This object can be achieved according to the present invention by means of polyvinyl butyrals (PVBs) that contain as oxidation stabilizers polynuclear phenols of the formula I specified below, additionally with or without specific co-stabilizers that act synergistically with the phenols of the formula I, and with or without further stabilizers, preferably light stabilizers, and also with or without further conventional additives and plasticizers.

The invention accordingly relates to polyvinyl butyrals (PVBs) having improved thermal stability and if desired improved light resistance, with contents of phenolic oxidation stabilizers and with or without light stabilizers and with or without plasticizers, which contain as phenolic stabilizers polynuclear phenols of the formula I

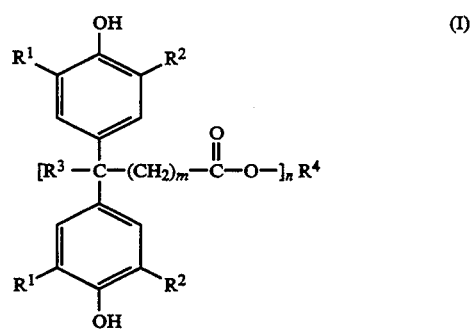

where
R$^1$ and R$^2$, which may be the same or different, are H, linear or branched C$_1$-C$_8$-alkyl or C$_4$-C$_8$-cycloalkyl, preferably cyclohexyl and preferably tert-butyl, $R^3$ is H or —$CH_3$, $R^4$, which may be monovalent or divalent, preferably linear and $\alpha,\omega$-divalent, is $C_1$-$C_{18}$-alkyl when n=1 or —$C_pH_{2p}$— with p=1 to 8, preferably p=2, when n=2, n=1 or 2, preferably 2 and m=1 to 4 if desired in combination with synergistically acting nitrogen-containing, sulfur-containing or phosphorus-containing co-stabilizers, preferably of the type a) nitrogen-containing compounds of the formula II

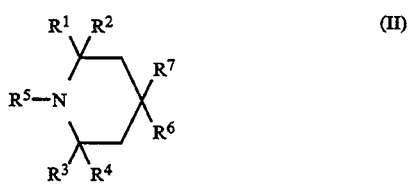

where $R^1$, $R^2$, $R^3$ and $R^4$, which may be the same or different, are $C_1$-$C_4$-alkyl, preferably methyl, or $C_4$-$C_8$-cycloalkyl, preferably cyclohexyl, $R^5$ is H, $C_1$-$C_{18}$-alkyl, $C_1$-$C_{18}$-hydroxyalkyl, $C_1$-$C_{18}$-alkoxy or $C_1$-$C_{18}$-acyloxy, preferably H, $R^6$ and $R^7$, which may be the same or different and may in each case be one of the radicals $R^6$ or $R^7$=H, are a monovalent organic radical having 1 to 30 carbon atoms, which may include one or more heteroatoms, which may be different, and also epoxy groups, or $R^6$ and $R^7$ together with the carbon atom of the piperidine ring form a monocyclic or polycyclic radical having up to 60 carbon atoms, which may be branched and may include one or more heteroatoms, which may be different, and also epoxy groups, and in addition polymeric or copolymeric forms of compounds of the formula II, or co-stabilizers preferably of the type b) nitrogen-containing compounds from the group comprising aliphatic carboxylic acid hydrazides or dicarboxylic acid dihydrazides, preferably having 2 to 12 carbon atoms, in particular adipic acid dihydrazide, particularly preferably acetic acid hydrazide, or co-stabilizers preferably of the type c) sulfur-containing compounds of the group di($C_4$-$C_{18}$)-alkyl sulfides and disulfides, preferably di($C_8$-$C_{12}$)-alkyl sulfides and disulfides, thiotin compounds of the formula $R_xSn(—S—CH_2—COOR)_y$, where x+y=4, x, y=1 to 3, preferably x, y=2, and R is $C_1$-$C_{18}$-alkyl, preferably $C_8$-$C_{12}$-alkyl, in particular octyl, di($C_1$-$C_{18}$)alkyl thiodipropionates, preferably di($C_8$-$C_{14}$)alkyl thiodipropionates, in particular dilauryl thiodipropionate, or co-stabilizers preferably of the type d) phosphorus-containing compounds of the group of hydrolysis-resistant phosphites, preferably alkyl-aryl phosphites, in particular tris(2,4-di-tert-butylphenyl) phosphite, or mixtures of co-stabilizers of compounds of the types a) to d), and if desired also e) light stabilizers, preferably UV stabilizers, in particular benzotriazole derivatives, and if desired f) plasticizers, further conventional stabilizers, conventional antiadhesion agents and conventional additives.

A particularly preferred compound of the formula I is bis [3,3-bis(4'-hydroxy-3'-tert-butylphenyl)butanoic acid] glycol ester, in which case in formula I $R^1$ is H, $R^2$ is tert-butyl, $R^3$ is methyl, m=1, n=2 and $R^4$ is —$CH_2$—$CH_2$—.

A characteristic structural feature of the ester group-containing phenolic compounds of the formula I according to the invention is, inter alia, the fact their phenolic rings are substituted in the para-position to the phenolic hydroxyl group by a quaternary carbon atom. When these compounds are used as antioxidants in plasticized PVB, processed as a thermoplastic by extrusion to give films, this structural feature results in a surprisingly marked reduction in the occurrence of undesired discoloration or yellowing of the films compared to the use of known phenolic antioxidants not covered by the invention, with which as is known yellowish films are generally obtained. Compared to the latter films, the films produced using antioxidants of the formula I according to the invention also have a considerably improved optical quality, i.e. they are substantially less colored, which is particularly important and advantageous for their use in the production of glass composites. Moreover, in the production of glass composites using plasticized PVB films that have been produced using antioxidants of the formula I according to the invention, considerably less edge discoloration in the glass composites occurs than when using comparable plasticized PVB films that have been produced by extrusion using phenolic antioxidants not covered by the invention. The glass composites are produced in a known manner by the autoclave method, in which test glass composites of size 30×30 cm are produced in an autoclave at 140° C., a pressure of 12 bar, and a holding time of 2 hours. The discoloration and yellowing of the films can be determined in a known manner by means of the Yellowness Index according to ASTM-D-1925.

The addition of the stabilizers according to the invention to the PVB can take place in the preparation of the PVB before or during the acetalation of the starting polyvinyl alcohol, and also before the extrusion of the PVB, in the latter case by firstly dissolving the stabilizers in the plasticizer and then plasticising the PVB with the plasticizer solution.

The addition of the stabilizer during production of the PVB is preferably effected by dropwise addition of the stabilizers, preferably dissolved in butyraldehyde or if desired dissolved in a water-dilutable solvent such as methanol or a 1:1 mixture of methanol and acetone, to the aqueous polyvinyl alcohol solution to be acetalated, the total amount of stabilizer accumulating in the resultant PVB and being thoroughly distributed in the latter.

The co-stabilizers of the formula II are preferably added to the PVB, preferably dissolved in the plasticizer, before or during the extrusion, the mixing of the stabilizer and plasticizer solution with the PVB being able to take place before the addition to the extruder or in the screw channel of the extruder. Also, the carboxylic acid hydrazides of the co-stabilizer type b) are added, preferably dissolved in the plasticizer, to the PVB preferably before or during the extrusion.

The compounds named hereinbefore as co-stabilizer types a) to d) surprisingly exhibit in combination with the phenolic antioxidants of the formula I according to the invention a synergistic antioxidative and thermostabilizing effect, by their ability to reduce further the oxidatively and thermally conditioned film discolorations, whereas such an effect is not observed when they are used individually, and the co-stabilizers of the formula II have moreover hitherto simply been known as light stabilizers in PVB. The light-stabilizing action of the co-stabilizers of the formula II is evidently retained, in PVB films, if they are synergistically combined with phenolic antioxidants of the formula I and can in addition contribute to the light stabilization of the PVB films. Particularly good synergistic effects can preferably be achieved by the combination of a plurality of different, preferably up to 4, co-stabilizers of the types a) to d) with phenolic antioxidants of the formula I.

The PVBs stabilized according to the invention by contents of compounds of the formula I and if desired in addition by contents of synergistically acting costabilizers of the types a) to d) may also contain further conventional light stabilizers in usual amounts, preferably UV stabilizers, in particular benzotriazole derivatives, and also conventional plasticizers, further conventional stabilizers, conventional antiadhesion agents and conventional additives, which are mixed in the usual way with the PVB.

The amount of phenolic antioxidants of the formula I according to the invention that is used in plasticizer-containing polyvinyl butyrals is preferably from 0.05 to 0.8% by weight, in particular from 0.07 to 0.5% by weight, and particularly preferably from 0.1 to 0.3% by weight, based on the PVB/plasticizer mixture.

In these amounts the phenolic antioxidants of the formula I according to the invention are considerably superior to comparable phenolic antioxidants of the prior art and not covered by the invention, and lead in particular to plasticizer-containing PVB flat films exhibiting a comparatively greatly reduced discoloration or yellowing and a considerably improved optical quality.

Examples of phenolic antioxidants not according to the invention that are used according to the closest prior art in the production of plasticized PVB flat films having reduced yellow values and that can be compared with the phenolic antioxidants of the formula I according to the invention are the mononuclear and frequently employed compound isobornylxylenol and also the polynuclear phenols triethylene glycol bis[3-(3'-tert-butyl-4'-hydroxy-5'-methylphenyl)propionate], 1,6-hexanediol bis[3-(3',5'-di-tert-butyl-4'-hydroxyphenyl)propionate] and pentaerythrityl tetrakis[3-(3',5'-di-tert-butyl-4'-hydroxyphenyl)-propionate].

Of the nitrogen-containing co-stabilizers of the type a) of the formula II specified hereinbefore, which structurally are piperidine derivatives, preference is given to the known light stabilizers of the "HALS" type (=hindered amine light stabilization). It was surprisingly found that their synergistic co-stabilizing and yellowing-inhibiting effect increases with increasing molecular weight of the HALS component, whereby plasticized PVB flat films having an even more greatly reduced tendency to yellowing can be obtained, with the result that the higher molecular weight HALS compounds of the type a) are particularly preferred co-stabilizers. Particularly preferred are also polymeric and copolymeric forms of compounds of the formula II, since, among other things, these also cannot migrate from the PVB. Particularly preferred are the polymeric and copolymeric forms prepared from epoxy group-containing compounds of the formula II. Preferred co-stabilizers of the formula II are the following compounds:

bis(2,2,6,6-tetramethylpiperidyl) sebacate, glutarate and succinate, bis(1,2,2,6,6-pentamethylpiperidyl) sebacate, glutarate and succinate, 4-stearyloxy- and -4-stearoyloxy-2,2,6,6-tetramethylpiperidine, 4-stearyloxy- and -4-stearoyloxy-1,2,2,6,6-pentamethylpiperidine, 2,2,6,6-tetramethylpiperidyl behenate, 1,2,2,6,6-pentamethylpiperidyl behenate, 2,2,4,4-tetramethyl-7-oxa-3,20-diazadispiro[5.1.11.2-]heneicosan-21-one, 2,2,3,4,4-pentamethyl-7-oxa-3,20-diazadispiro[5.1.11.2-]heneicosan-21-one, 2,2,4,4-tetramethyl-3-acetyl-7-oxa-3,20-diazadispiro[5.1.11.2]heneicosan-21-one, 2,2,4,4-tetramethyl-7-oxa-3,20-diaza-20-($\beta$-lauryloxycarbonylethyl)-21-oxodispiro[5.1.11.2]heneicosane, 2,2,3,4,4-pentamethyl-7-oxa-3,20-diaza-20-($\beta$-lauryloxycarbonylethyl)-21-oxodispiro[5.1.11.2]heneicosane, 2,2,4,4-tetramethyl-3-acetyl-7-oxa-3,20-diaza-20-($\beta$-lauryloxycarbonylethyl)-21-oxodispiro[5.1.11.2-]heneicosane, 1,1',3,3',5,5'-hexahydro-2,2',4,4',6,6'-hexaaza-2,2',6,6'-bismethano-7,8-dioxo-4,4'-bis(1,2,2,6,6-pentamethyl-4-piperidyl)biphenyl, N,N',N'',N'''-tetrakis{2,4-bis[N-(2,2,6,6-tetramethyl-4-piperidyl))butylamino]-1,3,5-triazin-6-yl}-4,7-diazadecane-1,10-diamine, N,N',N'',N'''-tetrakis{2,4-bis[N-(1,2,2,6,6-pentamethyl-4-piperidyl)butylamino]-1,3,5-triazin-6-yl}-4,7-diazadecane-1,10-diamine, N,N',N'',N'''-tetrakis{2,4-bis[N-(2,2,6,6-tetramethyl-4-piperidyl)methoxypropylamino]-1,3,5-triazin-6-yl}-4,7-diazadecane-1,10-diamine, N,N',N'',N'''-tetrakis{2,4-bis[N-(1,2,2,6,6-pentamethyl-4-piperidyl)methoxypropylamino]-1,3,5-triazin-6-yl}-4,7-diazadecane-1,10-diamine, bis(1,2,2,6,6-pentamethylpiperidyl) n-butyl-3,5-di-tert-butyl-4-hydroxybenzylmalonate, tris(2,2,6,6-tetramethyl-4-piperidyl) nitrilotriacetate, tetrakis(2,2,6,6-tetramethyl-4-piperidyl)-1,2,3,4-butanetetracarboxylic acid, 1,1'-(1,2-ethanediyl)bis(3,3,5,5-tetramethylpiperazinone).

Also suitable are poly-N,N'-bis(2,2,6,6-tetramethyl-4-piperidyl)1,8-diazadecylene, condensation products of 1-(2-hydroxyethyl)-2,2,6,6-tetramethyl-4-hydroxypiperidine and succinic acid, condensation products of N,N'-bis(2,2,6,6-tetramethyl-4-piperidyl)hexamethylenediamine and 4-tert-octylamino-2,6-dichloro-1,3,5-s-triazine, condensation products of N,N'-bis(2,2,6,6-tetramethyl-4-piperidyl)hexamethylenediamine and 4-morpholino-2,6-dichloro-1,3,5-triazine, and also polymerized 2,2,4,4-tetramethyl-7-oxa-3,20-diaza-20-(2,3-epoxypropyl)dispiro[5.1.11.2]heneicosan-21-one, obtained from the monomeric compound of the formula

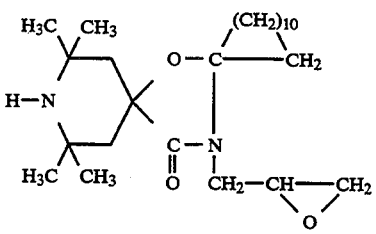

the polymerization taking place via the epoxypropyl group. This polymeric product is a particularly preferred co-stabilizer based on a formula II compound of the type a). The molecular weight of the polymer is not critical and can vary within a wide range, with the proviso that the product must always dissolve completely in the plasticized PVB to produce a clear solution.

When co-stabilizers of the types a) to d) according to the invention are used in combination with phenolic stabilizers of the formula I in plasticizer-containing polyvinyl butyrals, the amount of the phenolic formula I stabilizer used is preferably from 0.05 to 0.6% by weight, in particular from 0.07 to 0.4% by weight, particularly preferably from 0.1 to 0.3% by weight, and the amount of co-stabilizer or co-stabilizer mixture used is preferably from 0.01 to 0.5% by weight, in particular from 0.1 to 0.4% by weight, the total amount of formula I stabilizer and co-stabilizers preferably being $\leq 0.8\%$ by weight, in particular from 0.2 to 0.4% by weight, in each case based on the PVB/plasticizer mixture. The weight ratio of phenolic stabilizer of the formula I to the co-stabilizer or co-stabilizer mixture is preferably from 90:10 to 20:80.

In principle all polyvinyl butyral types that can be processed in plasticized form into plasticized PVB flat films by thermoplastic extrusion can advantageously be stabilized for thermoplastic processing with the phenolic stabilizers of the formula I according to the invention and also with combinations according to the invention of phenolic formula I stabilizers and synergistically acting co-stabilizers or co-stabilizer mixtures of the types a) to d). The suitable polyvinyl butyrals preferred for this purpose have a content of vinyl alcohol units of preferably from 17 to 29% by weight, in particular from 18.5 to 24% by weight, particularly preferably from 19 to 22% by weight, based on the PVB. The viscosity of the 5% by weight ethanolic solutions of the PVBs (measured according to DIN 53015) at 23° C. is preferably from 10 to 200 mPa.s, in particular from 50 to 100 mPa.s.

The plasticizers which may be used are all known plasticizers or plasticizer mixtures compatible with PVB and suitable for its plasticization. A list of commercially available plasticizers, including information on their compatibility with PVB, can be obtained for example from the publication Modern Plastics Encyclopedia 1981/1982, pp. 710 to 719. Preferred plasticizers are for example diesters of aliphatic diols, in particular of aliphatic polyether diols or polyether polyols, with aliphatic carboxylic acids, preferably diesters of polyalkylene oxides, in particular diesters of diethylene, triethylene and tetraethylene glycol with aliphatic $C_6$–$C_{10}$-carboxylic acids, preferably 2-ethylbutyric acid and n-heptanoic acid, and in addition diesters of aliphatic or aromatic $C_2$–$C_{18}$-dicarboxylic acids, preferably adipic, sebacic and phthalic acid, with aliphatic $C_4$–$C_2$-alcohols, preferably dihexyl adipate.

The plasticizers are used in conventional amounts for the plasticization of PVB, which amounts may preferably lie in the range from 20 to 50% by weight, in particular from 23 to 30% by weight, based on the PVB/plasticizer mixture.

Polyvinyl butyrals stabilized according to the invention with effective contents of phenolic antioxidants of the formula I and with or without contents of synergistically acting co-stabilizers of the aforedescribed types a) to d) and also with or without contents of further stabilizers, preferably light stabilizers, are used preferably in plasticized form and if desired with contents of further additives for the production of films by thermoplastic extrusion, and the resulting films are preferably used as interlayers in the production of laminated glasses from inorganic glass sheets, in which case laminated glasses of high quality having considerably reduced yellow coloration and surprisingly advantageous use properties can be obtained.

Instead of the polyvinyl butyrals plasticized by admixture with low molecular weight external plasticizers, internally plasticized polyvinyl butyrals whose melting points lie below their decomposition temperatures can also be stabilized and processed as thermoplastics according to the invention, if desired without the co-use of low molecular weight external plasticizers.

The polyvinyl butyrals stabilized and plasticized according to the invention are preferably extruded as thermoplastics using flat film extrusion dies into flat films preferably from 0.2 to 2 mm thick. The extrusion temperature of the extrusion molding materials is in the usual range, preferably from 140° to 250° C., higher temperatures also being able to be reached for short periods. The flat films can also be produced by shaping the plasticized PVB molding materials stabilized according to the invention on a heatable triple roll mill or a calender.

In addition to the aforementioned stabilizers and plasticizers, the extrusion molding materials may also contain further conventional additives, for example small amounts of alkali, preferably for example from 0.001 to 0.1% by weight, based on the PVB, of an alkali metal hydroxide or alkaline-reacting alkali metal salt to stabilize the PVB against acid hydrolysis. This alkali content is usually also termed the alkali titer of the PVB. The plasticized PVB extrusion molding materials may furthermore contain known antiadhesion agents in usual amounts, for example alkali metal salts or alkaline earth metal salts of carboxylic acids, preferably potassium salts or magnesium salts of formic acid or of acetic acid, or combinations of these salts with potassium salts or magnesium salts of hydroxycarboxylic acids, and in addition alkali metal or alkaline earth metal salts of dicarboxylic acids or magnesium acetylacetonate, and also various silanes or siloxanes, for example 3-(methyltriethyleneglycoxy)propylsilane tris-(methyltriethylene glycol) ester. The amount of these antiadhesion agents that is used is for example preferably in the range from 0.001 to 0.2% by weight, based on the PVB/plasticizer mixture.

If additional light stabilizers, preferably UV stabilizers, for example the known benzotriazole derivatives, are used as well, it has surprisingly been found that the amounts of these UV stabilizers that are used can be considerably reduced if they are used in combination with stabilizers of the formula I according to the invention and co-stabilizers of the formula II. This is on the one hand economically advantageous and also surprisingly results in films having improved color values, i.e. a lesser intrinsic color of the films, which is particularly important when the films are used for the production of glass composites.

Moreover, it is particularly important in the film extrusion of plasticized polyvinyl butyrals to be able to extrude at melt temperatures that are as high as possible, in order thereby to reduce the melt viscosity of the plasticized extrusion material as far as possible and maintain it as low as possible and to be able to achieve the largest possible extruder throughputs per unit time without oxidatively and/or thermally damaging the extrusion material and running the risk of yellowing. These requirements can be substantially met by using PVBs stabilized according to the invention.

The invention is described in more detail by means of the examples below.

EXAMPLE 1

Thermal and antioxidative stabilization of plasticized polyvinyl butyral (PVB) with the phenolic formula I stabilizer bis[3,3-bis(4'-hydroxy-3'-tert-butylphenyl)-butanoic acid] glycol ester according to the invention.

A PVB having a vinyl alcohol unit content of 20.1% by weight, based on the PVB, an alkali titer of 15 ml of N/100 HCl per 100 g of PVB and a viscosity of the 5% by weight ethanolic PVB solution at 23° C. of 62 mPa.s (measured according to DIN 53015) was prepared in a conventional manner by acetalation of polyvinyl alcohol in aqueous solution with butyraldehyde and with the addition of an acid catalyst, and the precipitated PVB was separated, washed in the usual way until neutral, then suspended in an aqueous medium rendered alkaline, and post-treated while intensively stirring, following which it was rewashed until neutral and dried. 0.3% by weight, based on the resulting PVB, of the aforementioned phenolic antioxidant of the formula I was dissolved in the butyraldehyde used for the acetalation, and was then distributed during the acetalation reaction in the PVB formed and was completely taken up in the latter. The PVB obtained, stabilized by the content of the compound of the formula I, was then plasticized with 26% by weight, based on the PVB/plasticizer mixture, of the plasticizer triethylene glycol di-n-heptanoate, and in addition was mixed with 0.08% by weight, based on the PVB/plasticizer mixture, of the antiadhesion agent potassium acetate and extruded in a twin-screw extruder (manufacturer: Haake) at a melt temperature of 200° C. to form a 0.8 mm thick flat film. The yellow coloration of the film was measured essentially according to the method described in ASTM-D-1925 on laminated glasses containing the film as interlayer, with elimination of the film-free glass sheet color value. The resultant measurement is the "Yellowness Index" (YI), the difference value ΔYI found from the measurement for the laminated glass minus the measurement for the film-free glass sheets of the laminated glass being given in the present examples. In the majority of the present examples the laminated glass was produced not by the autoclave method, but by a high-speed compression laboratory method in which the glass sheets were pressed with the interlayer composite films without using an autoclave at 150° C. with a holding time of 3 minutes at 12 bar, and the measured YI value of the film-free glass sheets that were used was subtracted from the measured YI value of the glass composite compressed with films, to give the specified ΔYI value. In the plasticized PVB film stabilized according to the invention as described in Example 1 the value for ΔYI was 1.9.

Comparative Examples 1 to 5

The process described in Example 1 was adopted, except that instead of the phenolic stabilizer according to the invention of the formula I, in each case an identical amount of a known phenolic stabilizer not according to the invention was added and the ΔYI value of each resulting plasticized PVB film was measured. In particular the following results were obtained with mononuclear and polynuclear phenols:

Comparative Example 1

The mononuclear compound isobornylxylenol was added as phenolic stabilizer. The resulting plasticized PVB film had a ΔYI value of 3.84.

Comparative Example 2

The polynuclear compound N,N'-bis[3-(3',5'-di-tert-butyl-4'-hydroxyphenyl)propionyl]hydrazine was added as phenolic stabilizer. The resulting plasticized PVB film had a ΔYI value of 2.71.

Comparative Example 3

The polynuclear compound pentaerythrityl tetrakis[3-(3,5-di-tert-butyl-4-hydroxyphenyl)propionate] was added as phenolic stabilizer. The resulting plasticized PVB film had a ΔYI value of 2.57.

Comparative Example 4

The polynuclear compound 1,6-hexanediol bis[3-(3',5=-di-tert-butyl-4'-hydroxyphenyl)propionate] was added as phenolic stabilizer. The resulting plasticized PVB film had a ΔYI value of 2.14.

Comparative Example 5

The polynuclear compound triethylene glycol bis[3-(3'-tert-butyl-4'-hydroxy-5'-methylphenyl)propionate] was added as phenolic stabilizer. The resulting plasticized PVB film had a ΔYI value of 2.85.

As the results of Comparative Examples 1 to 5 show, the ΔYI values obtained with the known phenolic stabilizers not according to the invention lie in the range from 2.14 to 3.84, i.e. considerably higher than the value according to the invention of 1.9 in Example 1; in other words, the films stabilized not in accordance with the invention suffer during thermoplastic extrusion processing a comparatively substantially greater degree of yellowing and discoloration than the film of Example 1 stabilized according to the invention. Since the ΔYI values become smaller with decreasing yellowing of the films, the value according to the invention of 1.9 in Example 1 represents an unexpectedly good stabilization result that has not hitherto been achieved with any of the known phenolic stabilizers. Particularly preferred therefore are stabilizers with which ΔYI values of ≦2.1, in particular ≦2, measured on laminated glasses, can be achieved, and which have been produced not by the autoclave method but instead by compression molding of two glass sheets of size 30×30×0.5 cm and of an intermediate plasticized PVB film according to the high-speed press laboratory method described in Example 1 without using an autoclave (3 minutes' holding time at 12 bar pressure and 150° C.), which can be effected without difficulty with the stabilizers of the formula I according to the invention, especially in combination with co-stabilizers according to the invention.

Laminated glass films with very low ΔYI values are important in particular for producing multilayer glasses, for example bullet-proof glasses, since the yellowness or yellow value of the film contributes substantially to the overall yellowing of the final glass composite.

EXAMPLES 2 to 12

Thermal and antioxidative stabilization of plasticized PVB with combinations of a phenolic stabilizer of the formula I according to the invention and various synergistically acting co-stabilizers according to the invention.

The starting PVB for Examples 2 to 12 was a PVB with a vinyl alcohol unit content of 20.6% by weight, an alkali titer of 14 ml N/100 HCl per 100 g of PVB and a viscosity of the 5% by weight ethanolic PVB solution at 23° C. of 58 mPa.s (measured according to DIN 53015) was prepared in a conventional manner with addition of an acid catalyst by acetalation of polyvinyl alcohol in aqueous solution with butyraldehyde in which 0.3% by weight, based on the resulting PVB, of the phenolic stabilizer bis[3,3-bis(4'-hydroxy-3'-tert-butylphenyl)butanoic acid] glycol ester of the formula I according to the invention had been dissolved, and the precipitated PVB, which contained the total amount of stabilizer, was separated, washed until neutral and dried in the conventional way as described in Example 1.

The stabilizer-containing PVB thus obtained was subdivided into 11 equal parts and plasticized in 11 parallel mixing processes with in each case 26% by weight, based on the PVB/plasticizer mixture, of the plasticizer triethylene glycol di-n-heptanoate, in which in each case a synergistically acting co-stabilizer according to the invention, as specified in Examples 3 to 12, had been dissolved. Those co-stabilizers that were insoluble in the plasticizer were dissolved in small amounts of an organic solvent or in water (e.g. the acid hydrazides) and this solution was added directly to the PVB/plasticizer mixture during the plasticization, and in addition 0.08% by weight, based on the PVB/plasticizer mixture, of potassium acetate as antiadhesion agent was also added to all mixtures.

The molding materials obtained were then extruded in each case into 0.8 mm thick flat films in a Brabender single-screw extruder at a melt temperature of 150° C. In order to evaluate the yellowing or yellow color of the films, the Yellowness Index (ΔYI) was measured according to ASTM-D-1925 as described in Example 1, the laminated glass test specimens being produced in each case according to the high-speed press laboratory method without the use of an autoclave.

In detail, the following results were obtained in Examples 2 to 12 with the various co-stabilizers:

EXAMPLE 2

The PVB/plasticizer molding material obtained according to the general preparation instructions given hereinbefore under the heading Examples 2 to 12 and containing the phenolic stabilizer was used, except that no costabilizer was added to it in the plasticization. The resulting co-stabilizer-free plasticized PVB film had a ΔYI value of 1.73.

EXAMPLE 3

The PVB/plasticizer molding material obtained according to the general preparation instructions given hereinbefore under the heading Examples 2 to 12 and containing the phenolic stabilizer was used, and 0.5% by weight, based on the PVB/plasticizer molding material, of dilauryl thiodipropionate was added as sulfur-containing co-stabilizer of the type c) to this molding material during the plasticization. The resulting plasticized PVB film had a ΔYI value of 1.28.

EXAMPLE 4

The PVB/plasticizer molding material obtained according to the general preparation instructions given hereinbefore under the heading Examples 2 to 12 and containing the phenolic stabilizer was used, and 0.5% by weight, based on the PVB/plasticizer molding material, of distearyl thiodipropionate was added as sulfur-containing co-stabilizer of the type c) to this molding material during the plasticization. The resulting plasticized PVB film had a ΔYI value of 1.44.

EXAMPLE 5

The PVB/plasticizer molding material obtained according to the general preparation instructions given hereinbefore under the heading Examples 2 to 12 and containing the phenolic stabilizer was used, and 0.5% by weight, based on the PVB/plasticizer molding material, of dioctyltin di-thioglycolic acid octyl ester was added as sulfur-containing co-stabilizer of the type c) to this molding material during the plasticization. The resulting plasticized PVB film had a ΔYI value of 0.83.

EXAMPLE 6

The PVB/plasticizer molding material obtained according to the general preparation instructions given hereinbefore under the heading Examples 2 to 12 and containing the phenolic stabilizer was used, and 0.2% by weight, based on the PVB/plasticizer molding material, of adipic acid dihydrazide was added as nitrogen-containing costabilizer of the type b) to this molding material during the plasticization. The resulting plasticized PVB film had a ΔYI value of 1.27.

EXAMPLE 7

The PVB/plasticizer molding material obtained according to the general preparation instructions given hereinbefore under the heading Examples 2 to 12 and containing the phenolic stabilizer was used, and 0.2% by weight, based on the PVB/plasticizer molding material, of acetic acid hydrazide was added as nitrogen-containing co-stabilizer of the type b) to this molding material during the plasticization. The resulting plasticized PVB film had a ΔYI value of 1.18.

EXAMPLE 8

The PVB/plasticizer molding material obtained according to the general preparation instructions given hereinbefore under the heading Examples 2 to 12 and containing the phenolic stabilizer was used, and 0.2% by weight, based on the PVB/plasticizer molding material, of bis(2,2,6,6-tetramethyl-4-piperidyl) sebacate was added as nitrogen-containing co-stabilizer of the type a) (HALS) to this molding material during the plasticization. The resulting plasticized PVB film had a ΔYI value of 1.56.

EXAMPLE 9

The PVB/plasticizer molding material obtained according to the general preparation instructions given hereinbefore under the heading Examples 2 to 12 and containing the phenolic stabilizer was used, and 0.2% by weight, based on the PVB/plasticizer molding material, of 2,2,4,4-tetramethyl-7-oxa-3,20-diazadispiro[5.1.11.2]-heneicosan-21-one was added as nitrogen-containing co-stabilizer of the type a) (HALS) to this molding material during the plasticization. The resulting plasticized PVB film had a $\Delta YI$ value of 1.53.

EXAMPLE 10

The PVB/plasticizer molding material obtained according to the general preparation instructions given hereinbefore under the heading Examples 2 to 12 and containing the phenolic stabilizer was used, and 0.2% by weight, based on the PVB/plasticizer molding material, of 2,2,4,4-tetramethyl-7-oxa-3,20-diaza-20-($\beta$-lauryloxycarbonylethyl)-21-oxodispiro[5.1.11.2-]heneicosan-21-one was added as nitrogen-containing co-stabilizer of the type a) (HALS) to this molding material during the plasticization. The resulting plasticized PVB film had a $\Delta YI$ value of 1.4.

EXAMPLE 11

The PVB/plasticizer molding material obtained according to the general preparation instructions given hereinbefore under the heading Examples 2 to 12 and containing the phenolic stabilizer was used, and 0.2% by weight, based on the PVB/plasticizer molding material, of polymerized 2,2,4,4-tetramethyl-7-oxa-3,20-diaza-20-(2,3-epoxypropyl)dispiro[5.1.11.2]heneicosan-21-one was added as nitrogen-containing co-stabilizer of the type a) (HALS) to this molding material during the plasticization. The resulting plasticized PVB film had a $\Delta YI$ value of 1.29.

EXAMPLE 12

The PVB/plasticizer molding material obtained according to the general preparation instructions given hereinbefore under the heading Examples 2 to 12 and containing the phenolic stabilizer was used, and 0.2% by weight, based on the PVB/plasticizer molding material, of tris-(2,4-di-tert-butylphenyl) phosphite was added as phosphorus-containing co-stabilizer of the type d) to this molding material during the plasticization. The resulting plasticized PVB film had a $\Delta YI$ value of 1.38.

EXAMPLE 13

A PVB was prepared according to the method described in Example 1, which contained 20.5% by weight, based on the PVB, of vinyl alcohol units, and had an alkali titer of 19 ml of N/100 HCl per 100 g of PVB, a viscosity of the 5% by weight ethanolic PVB solution at 23° C. of 60 mPa.s (measured according to DIN 53015) and a content of 0.3% by weight, based on the PVB, of the phenolic formula I stabilizer bis[3,3-bis(4'-hydroxy-3'-tert-butylphenyl)-butanoic acid] glycol ester according to the invention, the stabilizer, dissolved in butyraldehyde, being mixed with the PVB in the acetalation reaction.

EXAMPLE 14

A PVB was prepared according to the method described in Example 1, which contained 20.5% by weight, based on the PVB, of vinyl alcohol units, and had an alkali titer of 19 ml of N/100 HCl per 100 g of PVB, a viscosity of the 5% by weight ethanolic PVB solution at 23° C. of 60 mPa.s (measured according to DIN 53015) and a content of 0.15% by weight, based on the PVB, of the phenolic formula I stabilizer bis[3,3-bis(4'-hydroxy-3'-tert-butylphenyl)-butanoic acid] glycol ester according to the invention and 0.15% by weight, based on the PVB, of dilauryl thiodipropionate as sulfur-containing co-stabilizer of the type c), both the phenolic stabilizer and the co-stabilizer, in each case dissolved in butyraldehyde, being mixed with the PVB in the acetalation reaction.

EXAMPLE 15

A PVB was prepared according to the method described in Example 1, which contained 20.3% by weight, based on the PVB, of vinyl alcohol units and had an alkali titer of 19 ml of N/100 HCl per 100 g of PVB, a viscosity of the 5% by weight ethanolic PVB solution at 23° C. of 60 mPa.s (measured according to DIN 53015) and a content of 0.15% by weight, based on the PVB, of the phenolic formula I stabilizer bis[3,3-bis(4'-hydroxy-3'-tert-butylphenyl)-butanoic acid] glycol ester according to the invention and 0.15% by weight, based on the PVB, of polymerized 2,2,4,4-tetramethyl-7-oxa-3,20-diaza-20-(2,3-epoxypropyl)dispiro[5.1.11.2]heneicosan-21-one as nitrogen-containing co-stabilizer of the type a) (HALS), both the phenolic stabilizer and the co-stabilizer, in each case dissolved in butyraldehyde, being mixed with the PVB in the acetalation reaction.

Comparative Example 6

A PVB was prepared according to the method described in Example 1, which contained 21.3% by weight, based on the PVB, of vinyl alcohol units and had an alkali titer of 21 ml of N/100 HCl per 100 g of PVB, a viscosity of the 5% by weight ethanolic PVB solution at 23° C. of 60 mPa.s (measured according to DIN 53015) and, as a variation of Example 1, contained instead of the phenolic formula I stabilizer according to the invention 0.3% by weight, based on the PVB, of the phenolic stabilizer isobornylxylenol not according to the invention, the stabilizer, dissolved in butyraldehyde, being mixed with the PVB in the acetalation reaction.

EXAMPLE 16

The stabilized PVBs prepared according to Examples 13, 14 and 15 and al. so according to Comparative Example 6 were, after their plasticization with the plasticizer triethylene glycol di-n-heptanoate, subdivided in each case into several sample amounts, the individual samples were in each case subjected to the various processing conditions specified hereinafter under A to D, and the discolorations and yellow values ($\Delta YI$) of the flat films and glass composites formed in each case were measured. Specifically, the following procedures were adopted:

A: Kneader tests The PVB/plasticizer molding materials containing in each case 27% by weight of plasticizer were treated in each case for 10 minutes in a kneader operating at 50 r p.m. at 150° C. the compositions were in each case then press-molded in a platen press at a melt temperature of 150° C. into a 0.8 mm thick flat film, and the yellow value ($\Delta YI$) of the film in the glass composite was measured. The result is summarized in Table 1.

Extrusion in a Haake twin-screw extruder The PVB/plasticizer molding materials containing in each case 26% by weight of plasticizer, to each of which in addition 0.08% by weight, based on the PVB/plasticizer molding material, of potassium acetate had additionally been added as antiadhesion agent during the plasticization, were in each case extruded at a melt temperature of 215° C. in a twin-screw extruder into a 0.8 mm thick flat film and the yellow value (ΔYI) of the film in the glass composite was measured. The result is summarized in Table 1.

C: Extrusion in a Leistritz twin-screw extruder The PVB/plasticizer molding materials containing in each case 26% by weight of plasticizer, to each of which in addition 0.08% by weight, based on the PVB/plasticizer molding material, of potassium acetate had in each case been added as antiadhesion agent during the plasticization, were extruded at a melt temperature of 155° C. in a twin-screw extruder in each case into a 0.8 mm thick flat film and the yellow value (ΔYI) of the film in the glass composite was measured. The result is summarized in Table 1.

D: From the plasticized PVB sheets obtained according to the processing variant C, glass composites were in each case produced in an autoclave at 140° C., a pressure of 12 bar and a holding time of 2 hours from two glass sheets each of size 3×30×0.5 cm and an intermediate plasticized PVB film, similarly to the conventional large-scale production method for multilayer bullet-proof glasses and safety glasses for automobiles. The Yellowness Index (ΔYI) of the glass composite films was measured according to ASTM-D-1925 on the finished glass composites, after having determined the blank glass correction. The edge discoloration in the glass composites produced by the autoclave method was assessed visually. The yellow values (ΔYI) of the films and the extent of the glass composite edge discolorations are summarized in Table 1.

The yellow values (ΔYI) given in Table 1 for the plasticized PVB films obtained according to the processing variants A, B and C were measured on laminated glasses that had been produced not by the autoclave method but instead by the high-speed press laboratory method without using an autoclave, described in Example 1 (3 minutes' holding time at 150° C. and 12 bar pressure). The yellow values (ΔYI) for the plasticized PVB films formed in the processing variant D were measured on laminated glasses that had been produced by the autoclave method (2 hours' holding time at 12 bar and 140° C. in the autoclave), in which case in particular the problem of edge discolorations may also be of special relevance.

TABLE 1

| Stabilized PVB/plasticizer molding material of | Yellow values (ΔYI) of the plasticized PVB films formed in the processing variants A, B, C and D, and their edge discolorations in the case of D | | | |
|---|---|---|---|---|
| | A (ΔYI) | B (ΔYI) | C (ΔYI) | D (ΔYI) |
| Comparative Example 6 | 13.92 | 2.78 | 2.13 | 3.48 5 mm brown edge |
| Example 13 | 11.59 | 2.10 | 1.78 | 3.12 0.5 mm brown edge |
| Example 14 | 9.58 | 1.83 | 1.49 | 2.71 0.5 mm brown edge |
| Example 15 | 10.41 | 1.96 | 1.59 | 2.82 0.5 mm brown edge |

As can be seen from the results in Table 1, the best stabilization effects are obtained with the molding materials from Examples 14 and 15, the synergistic effectiveness of the co-stabilizers according to the invention being particularly evident compared to Example 13 in which case there is no co-stabilizer. The result with the molding material of Comparative Example 6 not according to the invention is considerably worse compared to the results according to the invention, both as regards the ΔYI values and also, in particular, as regards the 10-times wider brown edge on the glass composite produced according to the autoclave method.

We claim:

1. A polyvinyl butyral having improved thermal stability and if desired improved light resistance, with contents of oxidation stabilizers and with or without plasticizers, the oxidation stabilizers consist of polynuclear phenols of the formula I

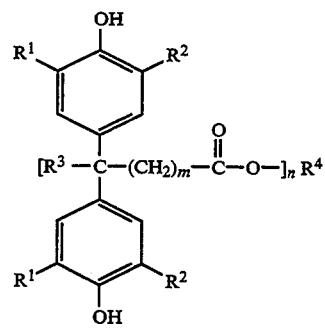

where $R^1$ and $R^2$, are individually selected from the group consisting of H, $C_1$-$C_8$-alkyl and $C_4$-$C_8$-cycloalkyl, $R^3$ is H or —$CH_3$ $R^4$ is $C_1$—$C_{18}$ -alkyl when n=1 or —$C_pH_{2p}$— with p=1 to 8 when n=2, optionally in combination with synergistically acting nitrogen-containing or sulfur-containing costabilizers selected from the group consisting of a) nitrogen-containing compounds of the formula II

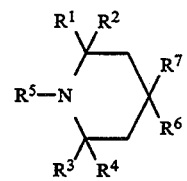

where $R^1$, $R^2$, $R^3$ and $R^4$ are individually selected from the group consisting of $C_1$-$C_4$ alkyl and $C_4$-$C_8$-cycloalkyl, $R^5$ is H, $C_1$-$C_{18}$-hydroxyalkyl, $C_1$-$C_{18}$-alkoxy or $C_1$-$C_{18}$-acyloxy, $R^6$ and $R^7$ are individually H or a monovalent organic radical having 1 to 30 carbon atoms, optionally including one or more heteroatoms, which may be different with the proviso that $R^6$ and $R^7$ are not both hydrogen, or $R^6$ and $R^7$ together with the carbon atom of the piperidine ring form a monocyclic or polycyclic of up to 60 carbon atoms, which may include one or more heteroatoms, which may be different, and in addition polymeric or copolymeric forms of compounds of the formula II, b) nitrogen-containing compounds selected from the group consisting of aliphatic carboxylic acid hydrazides or dicarboxylic acid dihydrazides having 2 to 12 carbon atoms, c) sulfur-containing compounds selected from the group consisting of di($C_4$–$C_{18}$)-alkyl sulfides and disulfides, thiotin compounds of the formula $R_xSn(-S-CH_2-COOR)_y$, where $x+y=4$, x, $y=1$ to 3, and R is $C_1$–$C_{18}$-alkyl thiodipropionates, or mixtures of co-stabilizers of compounds of a) to c), optionally d) light stabilizers, and optionally e) plasticizers and conventional antiadhesion agents.

2. A polyvinyl butyral as claimed in claim 1, wherein the content of phenolic stabilizers of the formula I is from 0.05 to 0.8% by weight, based on the polyvinyl butyral + plasticizer fraction.

3. A polyvinyl butyral as claimed in claim 1, wherein the content of synergistically acting co-stabilizers of the types a) to d) is from 0.01 to 0.5% by weight, and the sum of all stabilizers of the formula I and all co-stabilizers is together ≦0.8% by weight, based on the polyvinyl butyral + plasticizer fraction, the weight ratio of the stabilizers of the formula I to the sum of the co-stabilizers being in the range from 90:10 to 20:80.

4. A polyvinyl butyral as claimed in claim 1, wherein the plasticizer content is from 20 to 50% by weight, based on the polyvinyl butyral + plasticizer fraction.

5. A polyvinyl butyral as claimed in claim 1, which contains as phenolic stabilizer of the formula I bis[3,3-bis(4'-hydroxy-3'-tert-butylphenyl)butanoic acid] glycol ester.

6. A polyvinyl butyral as claimed in claim 1, which contains as co-stabilizers compounds of the formula II or their polymeric or copolymeric forms.

7. A polyvinyl butyral as claimed in claim 1, which contains as co-stabilizers, individually or as a mixture, compounds of the group of polymerized 2,2,4,4-tetramethyl-7-oxa-3,20-diaza-20-(2,3-epoxypropyl)dispiro[5.1.11.2]heneicosan-21-one, adipic acid dihydrazide, acetic acid hydrazide, and dilauryl thiodipropionate.

8. A polyvinyl butyral as claimed in claim 1, wherein the polyvinyl butyral contains from 17 to 29% by weight of vinyl alcohol units and the viscosity of the polyvinyl butyral in 5% by weight ethanolic solution, measured according to DIN 53015 at 23° C., is in the range from 10 to 200 mPa.s.

9. A polyvinyl butyral as claimed in claim 1, which contains as plasticizer diesters of aliphatic polyether diols or polyether polyols with aliphatic carboxylic acids or diesters of aliphatic or aromatic dicarboxylic acids with aliphatic alcohols.

10. A polyvinyl butyral as claimed in claim 1, which is in the form of a plasticizer-containing films from 0.2 to 2 mm thick and if desired contains as further additives from 0.001 to 0.1% by weight of an alkali metal hydroxide or an alkaline-reacting alkali metal salt, from 0.001 to 0.2% by weight of antiadhesion agent from the group of alkali metal salts or magnesium salts of carboxylic acids or dicarboxylic acids, magnesium acetylacetonate, silanes or siloxanes, and conventional light stabilizer.

11. A process for preparing polyvinyl butyral compositions as claimed in claim 1, wherein the polyvinyl butyral compositions are prepared by acetalation of polyvinyl alcohols with butyraldehyde in aqueous solution under acid catalysis and optionally the stabilizers and optionally co-stabilizers, which may be dissolved in butyraldehyde, are added in the acetalation reaction, the polyvinyl butyral is separated, plasticized with plasticizer, optionally stabilizers and optionally co-stabilizers and further conventional additives and light stabilizers are incorporated by mixing and optionally the stabilized and plasticized polyvinyl butyral molding material is thermoformed in an extruder at temperatures from 140° to 250° C., with the production of from 0.2 to 2 mm thick plasticizer-containing films.

12. A laminated glass of silicate glass sheets having interlayer films of plasticized polyvinyl butyral the interlayer films comprising effectively stabilized plasticizer-containing polyvinyl butyral as claimed in claim 1.

13. A laminated glass as claimed in claim 1 in the form of vehicle glass, marine glass, aeronautical glass, architectural glass for the construction sector or bullet-proof glass.

14. In a laminated glass or glass composite having improved optical properties with an inner layer of film between the glass sheets, the improvement comprising using a film of the composition of claim 1 as the inner layer.

* * * * *